UNITED STATES PATENT OFFICE.

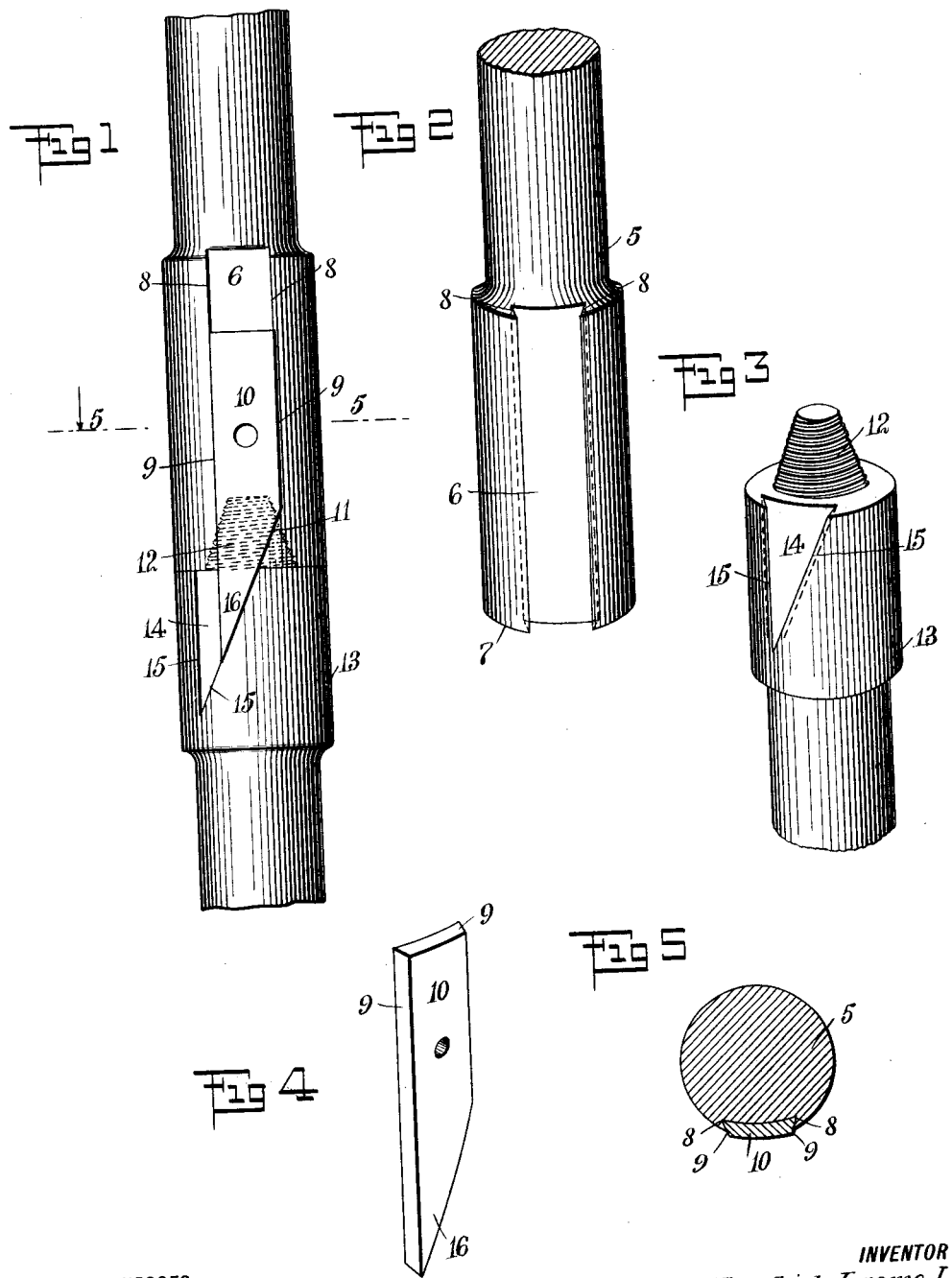

EUCLID JEROME LOWE, OF LAS CASCADAS, CANAL ZONE.

DRILL-ROD COUPLING.

1,102,064. Specification of Letters Patent. Patented June 30, 1914.

Application filed August 26, 1913. Serial No. 786,713.

*To all whom it may concern:*

Be it known that I, EUCLID JEROME LOWE, a citizen of the United States, and a resident of Las Cascadas, Canal Zone, Panama, have invented a new and Improved Drill-Rod Coupling, of which the following is a full, clear, and exact description.

My invention relates to couplings for drill rods for holding drill points rigid relatively to the main rod, and it has for its object to provide means which will automatically take up any and all slack in the coupling, which may be occasioned by the wearing of the parts under the severe usage under which a drill is normally put.

As my coupling is constructed, the drill rod and the drill point have threaded portions which mesh with each other, the drill rod having a slot or key-way for receiving a shank of a wedge member, and the drill point having a wedge shaped opening for receiving the wedge on the said shank. When the threads in the drill member and the drill point are in mesh and the drill point has been turned home, the wedge member is introduced in the slot or key-way, and its wedge is driven down in the wedge shaped opening in the drill point, to hold the drill point rigid relatively to the drill member, the wedge member moving down when the parts become worn, and there is any slack between the drill member and the drill point. The slightest looseness caused by the wearing of the parts is immediately taken up by the wedge member.

Additional objects of the invention will appear in the following complete specification, in which the preferred form of the invention is disclosed.

Reference is to be had to the accompanying drawings forming a part of this specification, in which similar characters of reference indicate corresponding parts in all the views.

Figure 1 is a front elevation showing my invention; Fig. 2 is a similar view of the drill rod; Fig. 3 is a perspective view of the drill point; Fig. 4 is a perspective view of the wedge member; and Fig. 5 is a sectional view on the line 5—5 of Fig. 1.

By referring to the drawings, it will be seen that the drill rod 5 has a slot or key-way 6 in its periphery, which extends through the end 7 of the drill rod. The sides 8 of the slot 6 converge outwardly, as will be seen by referring to the drawings, so that they will embrace the sides 9 of the wedge member 10, the said sides 9 converging outward at angles corresponding with those of the sides 8 of the slot or key-way 6. At the end 7 of the drill rod 5 there is a threaded opening 11 for receiving the threaded stud 12 on the drill point 13, the threaded stud 12 normally meshing in the threaded opening 11 in the drill 5 and with the drill point 13 turned home, as shown in Fig. 1 of the drawings. As will be seen by referring to Figs. 1 and 3, the threaded stud 12 and the threaded opening 11 are tapered, but this is not a feature of the invention and is not important. In the periphery of the drill point 13, there is an opening 14, the sides 15 of which converge outwardly and also longitudinally of the drill point and away from the threaded stud 12. When the threaded stud 12 meshes in the threaded opening 11 in the drill rod 5, and the drill point 13 has been turned home, the wedge member 10 is introduced in the slot or key-way 6 in the drill rod 5, and its lower or wedge portion 16 is driven into the opening 14 in the periphery of the drill point 13. The outwardly converging sides 9 of the wedge member 10 not only fit the sides 8 of the slot or key-way 6, but they are also adapted to fit the sides 15 of the opening 14.

As the wedge member 10 is driven down into the opening 14, it tends to rotate the drill point 13 and the drill rod 5 relatively to each other and to hold the drill point 13 rigid relatively to the drill rod 5. It will also be seen that with any wearing of the adjacent ends of the drill point and drill rod, or of the threads on the stud 12, or in the threaded opening 11, the wedge member 10 will work down to take up any slack caused by the wearing of the parts, and thereby hold the drill point 13 rigid relatively to the drill rod 5 at all times.

Having thus described my invention, I claim as new and desire to secure by Letters Patent:

In a device of the character described two members having threads at adjacent ends which normally mesh with each other, there being a slot in one of the members extending through its said end and an opening in the other member extending through its said end, one side of the opening converging relatively to the other side and a wedge member disposed in the slot with its wedge portion extending into the opening and with one side of its wedge portion engaging the first mentioned side of the opening, the other side of the wedge portion of the wedge member being normally spaced from the second mentioned side of the opening so that with the wearing of the first two members at their said ends, the wedge member will move down into the opening to take up all slack and hold the first two mentioned members rigid relatively to each other.

In testimony whereof, I have signed my name to this specification in the presence of two subscribing witnesses.

EUCLID JEROME LOWE.

Witnesses:
F. H. SHEIBLEY,
E. M. GOOLSBY.

Copies of this patent may be obtained for five cents each, by addressing the "Commissioner of Patents, Washington, D. C."